US008675482B1

(12) United States Patent
Lu et al.

(10) Patent No.: US 8,675,482 B1
(45) Date of Patent: Mar. 18, 2014

(54) METHOD AND APPARATUS FOR COOPERATIVE COMMUNICATIONS BETWEEN GROUPS OF COMMUNICATION UNITS

(75) Inventors: Ning Lu, Clifton, NJ (US); Michael Mayor, Fort Wayne, IN (US)

(73) Assignee: Exelis Inc., McLean, VA (US)

( * ) Notice: Subject to any disclaimer, the term of this patent is extended or adjusted under 35 U.S.C. 154(b) by 304 days.

(21) Appl. No.: 12/536,177

(22) Filed: Aug. 5, 2009

(51) Int. Cl.
*G08C 15/00* (2006.01)
(52) U.S. Cl.
USPC ............................ 370/230; 370/252; 370/345
(58) Field of Classification Search
USPC ......... 370/229, 230, 231, 255, 311, 314, 336, 370/345, 392, 442, 458, 498, 537, 536, 540
See application file for complete search history.

(56) References Cited

U.S. PATENT DOCUMENTS

| 5,233,626 | A | 8/1993 | Ames |
| 5,369,682 | A | 11/1994 | Witsaman et al. |
| 5,446,924 | A | 8/1995 | Christian et al. |
| 5,652,748 | A | 7/1997 | Jolma et al. |
| 6,665,521 | B1 | 12/2003 | Gorday et al. |
| 7,218,682 | B2 * | 5/2007 | Mayor et al. ................. 375/299 |
| 2001/0043578 | A1 | 11/2001 | Kumar et al. |
| 2005/0058218 | A1 * | 3/2005 | Jenkins ........................ 375/295 |

FOREIGN PATENT DOCUMENTS

| DE | 19952900 A1 | 5/2001 |
| WO | 0209306 A1 | 1/2002 |

OTHER PUBLICATIONS

Ning H. Lu, "Linearized, Unified Two-Ray Formulation for Propagation Over a Plane Earth," Si-5031, SICON 2005, Feb. 2005, Houston, TX.

* cited by examiner

*Primary Examiner* — Yemane Mesfin
*Assistant Examiner* — Mon Cheri Davenport
(74) *Attorney, Agent, or Firm* — Edell, Shapiro & Finnan, LLC

(57) ABSTRACT

Enhanced reception in a communication system is achieved by synchronously combining transmissions from a cluster of transmitting communication devices at a group of distant receiving communication devices. The transmitting communication devices coordinate their transmissions such that each device transmits the same signal on the same communication channel at different transmission times. As a consequence of the spatial diversity of the transmitting and receiving communication devices and the temporal diversity of the transmission times, the transmitted signals arrive at the receiving communication devices at different times. The receiving communication devices each essentially treat the different transmitted signals as though they were different multipath signals from a single transmitting communication device. This permits detection at a greater range or with a lower bit error rate. In addition, the many-to-many configuration enables a communication protocol to be maintained without modification of the protocol or termination (or interruption) of a protocol message sequence.

25 Claims, 12 Drawing Sheets

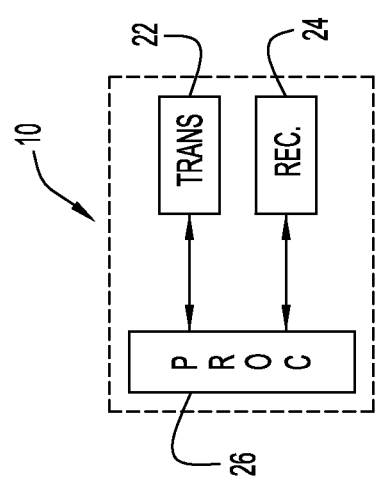

METHOD AND APPARATUS FOR COOPERATIVE COMMUNICATIONS BETWEEN GROUPS OF COMMUNICATION UNITS

BACKGROUND

1. Field of the Invention

Embodiments of the present invention relate to methods and apparatus for enhancing transmission and reception of signals between groups of communication units and, more particularly, to techniques for synchronously combining coordinated transmissions from plural communication units of a group at receiving communication units within a distant group to extend range performance while maintaining the communication protocol employed for the communication.

2. Description of the Related Art

One factor affecting range performance in wireless communication systems is the power with which signals are transmitted. Generally, the strength of a received signal is proportional to the transmit power and inversely proportional to the $n^{th}$ power of the range between the transmitter and receiver. Depending on the underlying terrain, n could generally range from 2 to 6. At a given transmit power, as the range between a transmitting device and a receiving device increases, the signal strength at the receiving device becomes increasingly attenuated, eventually prohibiting reception. Range performance improves with increasing transmit power; conversely, lower transmit power reduces the maximum range at which transmitted signals can be detected.

Unfortunately, there are a number of circumstances in which transmit power is limited by equipment capabilities, operational requirements or both. For example, with mobile communication devices which rely on battery power supplies, the maximum transmit power may be limited by design to achieve a tradeoff between operating range and battery power consumption. Other equipment cost or performance considerations may dictate transmit power capabilities that limit operational range or limit system performance under harsh operating conditions.

In certain circumstances, a need may exist to minimize RF emissions. In military contexts, particularly in battlefield situations, minimizing transmit power reduces the likelihood of signal detection by hostile parties, thereby preventing the transmitter's position from being compromised. For example, in a situation where a small team of radio-equipped personnel is located within a hostile region and must communicate with a distant device, for any single radio to communicate with the distant device, considerable transmit power would be required, resulting in a significant opportunity for detection by hostile forces. Moreover, the transmit power level required to communicate over significant distances would likely drain the radio's battery more rapidly than desired.

In other contexts, low transmit power levels may be advantageous or required to minimize interference with other devices, particularly in high bandwidth usage situations, such as with wireless telephony. In general, it would be advantageous in a variety of applications to achieve certain range performance with reduced transmit power levels or, conversely, to increase range performance without increasing transmit power.

Operational parameters other than transmit power can be optimized for better range performance under certain conditions. For example, antenna gain may be increased using a directional antenna, or more sophisticated receiver schemes can be employed. In some cases, the problem of limited range performance (or, equivalently, limited transmit power) may be overcome using repeaters to boost the signal power at an intermediate location between the source transmitter and destination receiver. However, each of these solutions has drawbacks, such as increased size, cost and circuit complexity, overall system complexity, and increased energy requirements. Such solutions are especially disadvantageous in covert military situations where minimizing size and transmit power and maximizing stealth are of utmost importance. Accordingly, it would be highly desirable in power-limited scenarios to enhance range performance without resorting to such solutions.

SUMMARY

Therefore, in light of the above, and for other reasons that become apparent when example embodiments of the present invention are fully described, an object of a present invention embodiment is to enhance the range performance of a group of communication devices communicating with a distant group of communication devices, thereby permitting communication over a range greater than that achievable by any single device transmitting at a particular power level.

Another object of a present invention embodiment is to reduce the transmit power required from any single communication device in order to reduce the probability of signal interception by unintended recipients.

A further object of a present invention embodiment is to increase the overall signal strength of a transmitted signal at a group of receiving communication devices without having to increase the transmit power from an individual transmitting communication device.

Yet another object of a present invention embodiment is to coordinate signal transmissions of plural communication devices to effectively send the same signals from plural locations to a group of receiving communication devices and thereby improve the detectability of the information in these signals.

Still another object of a present invention embodiment is to take advantage of collective transmit power of clusters of communication devices to communicate signals with greater effective transmit power than is available from individual devices in the cluster.

A further object of a present invention embodiment is to enable groups of communication devices to cooperatively transmit and receive signals while maintaining the communication protocol employed (e.g., without modification of the communication protocol).

The aforesaid objects may be achieved individually and/or in combination, and it is not intended that a present invention embodiment be construed as requiring two or more of the objects to be combined unless expressly required by the claims attached hereto.

Enhanced reception of transmitted signals in a digital communication system is achieved by synchronously combining transmissions from a cluster of transmitting communication devices at a group of distant receiving communication devices. The transmitting communication devices coordinate their transmissions such that each device transmits the same signal on the same communication channel at different coordinated transmission times. As a consequence of the spatial diversity of the transmitting and receiving communication devices and the temporal diversity of the transmission times, the transmitted signals arrive at the receiving communication devices at different times. The receiving communication devices each essentially treat the different transmitted signals as though they were different multipath signals from a single transmitting communication device. A multipath equalizer or combiner is used to determine timing offsets among the received signals, and the received signals are time aligned by phase rotating the signals in accordance with the estimated timing offsets. The time-aligned signals are then coherently combined and detected. The combined signal has a greater signal-to-noise ratio than the individual received signals, permitting detection at a greater range or with a lower bit error rate without having to increase the transmit power of any individual transmitting communication device. Consequently, enhanced signal reception and range performance can be achieved in systems where transmit power is limited by operational constraints or equipment limitations.

An embodiment of the present invention achieves significantly enhanced communications performance by two-way cooperative communications between a group of communication devices and a distant group of communication devices. An embodiment of the present invention employs a many-to-many configuration enabling cooperative communications to be utilized for many versatile, effective, efficient, and unique applications. For example, a group of communication devices would be able to cooperatively communicate with a distant group at a greater range than would be possible by the communication devices when operating independently. Further, a group of communication devices would be able to cooperatively communicate with a distant group at a minimal power level for covert, energy-efficient, or high-throughput operations.

Embodiments of the present invention provide several advantages. In particular, range performance of communications between groups of communication devices is enhanced, thereby permitting communication over a range greater than that achievable between any two single communication devices transmitting at the same power level. This aspect satisfies key operational needs for remote sensing and special operations.

Further, transmit power required for the communications from any single communication device is reduced. This reduces the probability of signal interception by unintended recipients, and minimizes the implementation cost (e.g., minimizes the size, weight, and power (SWAP) and cost of the implementation hardware). In addition, the reduction in required transmit power increases the energy efficiency of the transmitter power amplifier, thereby maximizing the life of the underlying application.

Moreover, the signal detectability of a received signal at a group of distant communication devices is increased without having to increase the transmit power from an individual transmitting communication device. This maximizes the signal detectability by coherent combining. In addition, coordinating signal transmissions of plural communication devices to effectively send the same signals from plural locations to plural receiving communication devices minimizes the power spectrum density of transmissions over the air, and enables embodiments of the present invention to enhance covert operations.

The above and still further objects, features and advantages will become apparent upon consideration of the following detailed description of example embodiments of the present invention, particularly when taken in conjunction with the accompanying drawings wherein like reference numerals in the various figures are utilized to designate like components.

BRIEF DESCRIPTION OF THE DRAWINGS

FIG. 1B is a block diagram of an example communication device employed by embodiments of the present invention.

DETAILED DESCRIPTION OF EXAMPLE EMBODIMENTS

Embodiments of the present invention involve a signal combining technique in which signals are transmitted in a coordinated manner from plural communication devices in relatively close proximity to each other (e.g., a "cluster" or "team" of devices) to a plurality of receiving communication devices each coherently combining the signals as if they were different multipath rays of a single transmission. The combined signal power enables reception of signals over ranges far greater than would otherwise be possible with a single device transmitting at the same single-device power level. The signals are transmitted from the communication devices with appropriate relative transmission time offsets. This enables the transmitted signals to arrive at one or more destination communication devices within Rake multipath processing windows, and be resolvable by Rake receivers of those destination communication devices. In addition, the team-to-team (or many-to-many) configuration of present invention embodiments enables a communication protocol to be maintained without modification of the protocol or termination (or interruption) of a protocol message sequence.

The signal combining concept according a present invention embodiment uses the collective resources of a number of communication devices by synchronizing or coordinating transmission and reception of signals. Proper coordination enables the cluster of communication devices to collectively transmit the same information-bearing signals, such that an intended group of receiving communication devices can each process the received signals to significantly improve the communications performance (e.g. quality of service, range, etc.) with efficient utilization of transmitting energy.

Figure 1A:
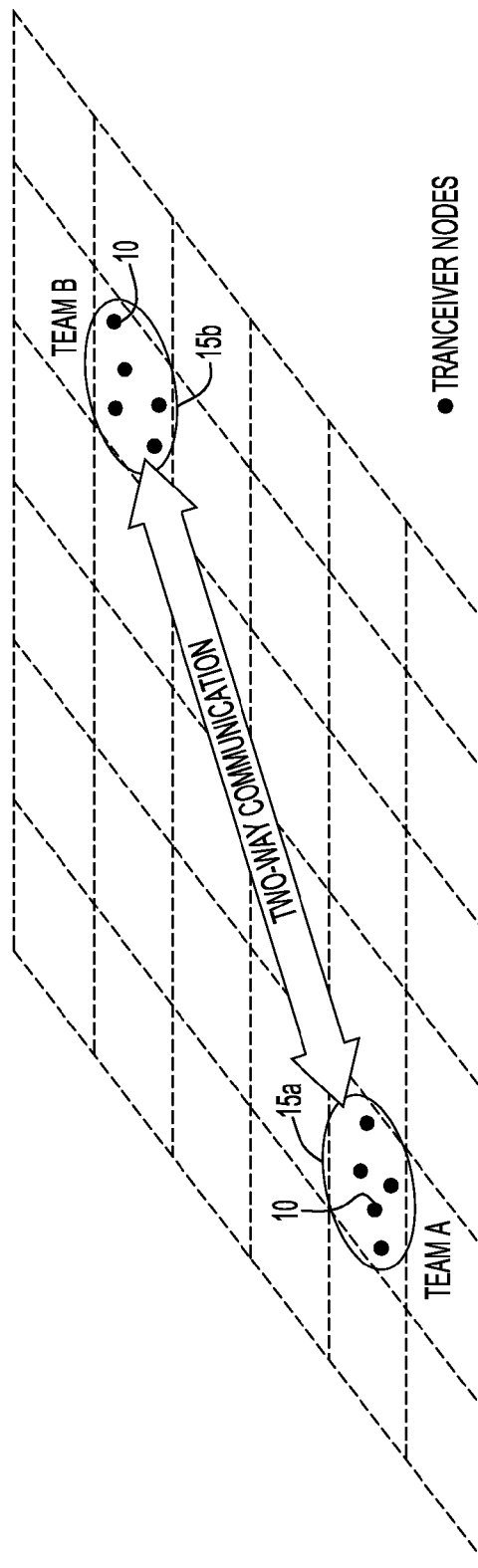
FIG. 1A is a conceptual representation of a plurality of transmitting communication devices of a group communicating with a plurality of receiving communication devices of a distant group by synchronously transmitting the same signal according to an embodiment of the present invention.

A representation of the concept underlying a present invention embodiment is illustrated in FIG. 1A. Each of a plurality of communication devices or nodes 10 is located within a limited geographical area, such that each of the communication devices can communicate with at least one of the other communication devices 10 either directly or via routing, thereby enabling communication among the communication devices. Groups 15a, 15b of communication devices so arranged can be considered to be in a "cluster" or "team" (e.g., TEAM A and TEAM B as viewed in FIG. 1A). Cluster 15a of communication devices 10 (e.g., TEAM A as viewed in FIG. 1A) communicate with another group 15b of communication devices 10 (e.g., TEAM B as viewed in FIG. 1A) by cooperatively transmitting the same information-bearing signal. As used herein and in the claims, the terms "cluster" and "team" refer to a set of two or more communication devices so positioned to permit a coordinated transmission of combinable signals from the communication devices. The communication devices of a cluster or team may be utilized for many practical military, commercial, and home applications. While the term cluster or team generally implies some degree of relatively close proximity, embodiments of the present invention are not limited to any particular maximum distance between devices in the cluster or maximum outer boundary for the cluster. Preferably, although not strictly required, all of the communication devices in a cluster are within the field of view or line of sight of each other, such that any two of the devices can communicate with each other directly. Alternatively, any two of the communication devices within a cluster may communicate via routing (e.g., with or without being in the line of sight). Some of the transmitting communication devices of cluster 15a may also be in motion relative to the other transmitting communication devices and to the receiving communication devices of cluster 15b.

As used herein and in the claims, a "communication device" or "communication unit" includes any device or unit, mobile or stationary, that includes a transmitter, receiver and/or processor and is capable of transmitting and/or receiving communication signals, including but not limited to: a handheld or body-mounted radio; any type of mobile or wireless telephone (e.g., analog cellular, digital cellular, PCS or satellite-based); a pager, beeper or PDA device; a radio carried on, built into or embedded in a ground-based or airborne vehicle; any portable electronic device equipped with wireless reception/transmission capabilities, including multimedia terminals capable of receiving/transmitting audio, video and/or data information; and any device or unit mounted in a fixed location with transmission/reception capabilities.

While the signals transmitted from the different transmitting communication devices arrive at receiving communication devices at different times, it should be understood that the signals are nevertheless transmitted on the same communication channel in much the same manner as multipath signals from a single transmitter are on the same communication channel. Thus, for example, if the system employs code division multiple access (CDMA), all of the transmitted signals are spread using the same code (e.g., the same PN code, Walsh function, etc.). Likewise, if the system employs frequency division multiple access (FDMA), all of the transmitted signals are on the same frequency channel within the available frequency band.

A plurality of communication devices 10 is remotely located from cluster 15a and forms cluster 15b. To be useful in transmitting signals to one or more receiving communication devices within cluster 15b, each of the communication devices of cluster 15a must be positioned such that its transmitted signals can travel over a path to one or more receiving communication devices of cluster 15b, and contribute to the power of the combined received signal. As shown in FIG. 1A, the receiving communication devices of cluster 15b may be located at a considerable distance from the communication devices of cluster 15a. In fact, an important aspect of embodiments of the present invention is the ability to receive signals from a cluster of communication devices beyond the maximum reception range possible with an individual communication device transmitting at a β specified power level. Due to the distance between clusters 15a and 15b, the signal quality of the communication between individual transmitting communication devices of cluster 15a and the receiving communication devices of cluster 15b may be poor. However, by synchronously combining each of the transmitted signals at each of the one or more intended receiving communication devices of cluster 15b as multipath rays corresponding to a single signal, the gain of the received signal may be significantly increased.

An example communication device 10 employed by present invention embodiments is illustrated in FIG. 1B. Specifically, communication device 10 includes a transmitter 22, a receiver 24, and a processor 26. The communication device may further include other components in accordance with a particular application (e.g., speaker, microphone, processing components, display screen, sensors, etc.). The processor is preferably implemented by a conventional microprocessor or controller and controls the communication device to transmit and receive messages in accordance with the cooperative communication scheme and protocols described below. The transmitter is preferably implemented by a conventional transmitter and transmits messages from the processor, preferably in the form of radio frequency (RF) signals, in accordance with processor instructions. Receiver 24 is typically implemented by a Rake type receiver, and configured to receive signals, preferably in the form of radio frequency (RF) signals, transmitted by the transmitter of another communication device. The receiver may process and forward the received signals to processor 26. The communication device preferably further includes an identification (ID) (e.g., a code or identification number) to identify the particular communication device, and a database (not shown) to store information pertaining to neighboring communication devices to facilitate reservations and/or routing. The identifier is unique to each communication device, and preferably pre-assigned (e.g., a serial number or an identification number).

While the advantages of embodiments of the present invention are readily apparent in scenarios where the cluster of receiving communication devices is located relatively far from the cluster of transmitting communication devices, it should be understood that embodiments of the present invention are not limited to any particular receiving cluster location or any particular minimum range from the transmitting cluster. For example, the signal combining technique of embodiments of the present invention can be implemented such that when a receiving communication device of the receiving cluster is well within the operating range of the transmitting devices, the transmit power of each of the transmitting devices can be reduced accordingly.

The communication devices in the transmitting cluster transmit the same signal to one or more receiving communication devices in the receiving cluster, and coordinate their respective transmit times such that the signals arrive at each of the one or more receiving communication devices within a narrow time window that allows each of the one or more receiving communication devices to constructively combine the plural signals. One of the transmitting communication devices is identified as the lead communication device. The lead device communicates with other communication devices in the transmitting cluster to coordinate transmission of a signal to one or more receiving communication devices in the receiving cluster. Preferably, the lead communication device is the device initiating transmission (e.g., the device whose operator desires to transmit a message to one or more receiving communication devices in the receiving cluster).

The lead device can be any of the devices in the transmitting cluster. For example, consider the case where the communication devices are in a peer-to-peer network. A key design premise of a peer-to-peer network is that there are no pre-determined "lead" devices. Following this fundamental principle, any transmitting communication device wanting to initiate a synchronized transmission will communicate this intention to neighboring communication devices in the cluster via a special message to set-up the cooperative communications. The initiating device does not need to know where the other members of the network are, nor how many communication devices there are to receive the message. The cluster of transmitting communication devices then operates to collectively transmit a data communication signal comprising a known data sequence portion or acquisition/synchronization portion and an information bearing signal portion containing the communication of interest to be transmitted to one or more receiving communication devices in the receiving cluster. Note that each transmitting communication device operates to transmit the same information bearing signal portion, and also transmit the known data sequence portion or a serial probe portion.

In accordance with an example embodiment, the transmitting communication devices attempt to transmit their respective messages at coordinated transmission times. This enables the transmitting communication devices to control the span of time over which the signals arrive at each of the one or more receiving communication devices to fall within a time window that enables the receiving communication devices to combine the signals. If each communication device has the GPS time, coordinating the transmission time would be straight forward and simple. When the communication device does not have the GPS time, the overall system must be synchronized relative to the Time-of-Day (ToD) of a reference node.

In accordance with the example embodiment, the overall system is synchronized relative to the Time-of-Day (ToD) of a reference node. Initially, the first communication device in cluster 15a which is turned on, $R_1$, will receive a signal indicating ToD to a resolution of 1 nanosecond (this is resolution not accuracy), for which 64 bits are sufficient. Specifically, for a one-hundred-year interval, $$D=100*365*24*60*60*1000*1000*1000=3.154\times 10^{18}$$

$$Nbits=\log 10(D)/\log 10(2)=61.5$$

Communication device $R_1$ initiates the clock counter and broadcasts a ToD message, $M_{ToD}$, to all other communication devices in the cluster network. The other communication devices $R_i$ (where i=2 to N) will receive $M_{ToD}$ and set their own clock counters relative to the ToD contained in the message, thereby establishing a common time reference among the devices.

The radius which covers all the network radius is related to the multipath window as follows. A radiowave propagates at a velocity of 3.333 $10^{-6}$ sec/km (3.333 μsec/km). This means that, in a network having a cluster of devices spread over a radius of 1 km, the ToD will be offset by at most 3.333 μsec. This coarse synchronization is sufficient for the system of a present invention embodiment to work correctly, provided that the multipath window at the receiver includes the propagation delays necessary to receive all transmitters. For example, a multipath window of ±25 μsec will readily be able to receive and combine all signals transmitted from the cluster, as described in greater detail hereinbelow.

To effect a transmission, one of the communication devices $R_i$ (where i=1 to N) of a transmitting cluster distributes a message $M_{data}$ to N−1 neighboring communication devices of the cluster that will be required to transmit in synchronism. This message contains a specified future ToD, $T_0$, indicating when the neighboring communication device is to transmit as well as the destination address of one or more receiving communication devices in a receiving cluster, designated $R_K$ (where K=1 to S). Observe that $T_0$ can be any time beyond the maximum propagation delay for the network radius. At the specified time $T_0$, the corresponding communication devices transmit the specified message to one or more destinations $R_K$. The receiving communication devices of the receiving cluster will receive all transmissions with offsets from the transmission time, $T_0$, of corresponding transmitting communication devices given by the initialization propagation delay, $d_{initial}$, plus the message transmission propagation delay, $d_{tx}$, plus the local clock time drift, $L_{drift}$. With a local clock (oscillator) accurate to ±1 part per million ($10^{-6}$), the total time offset from the transmission time would be up to:

$$T_{offset}=3.333 \text{ μsec}+3.333 \text{ μsec}+1 \text{ μsec}=7.666 \text{ μsec},$$

which when combined with the maximum difference between the transmission times is maintained well within the ±25 μsec multipath window stated above. This means that the receiving communication devices will appropriately combine the signals as though they were multiple reflections of an original signal. Importantly, no precise phase synchronization is required at the transmitting communication devices, since all that is required is that the set of transmitted signals arrive within the multipath window at the one or more receiving communication devices. Like multipath components, the several signals transmitted by the different transmitting communication devices in embodiments of the present invention arrive at the one or more receiving communication devices with completely random phases. It is the function of the multipath combiner at the receiving communication devices to align the phases of the arriving signals. It should be understood that embodiments of the present invention are not limited to the specific values used in the foregoing example. In general, the system will operate correctly if the multipath window is set to cover twice the maximum propagation delay plus the local clock offset and the maximum time difference between transmissions. For any specific system, this would be a relation between the maximum distance and how accurate (and expensive) the local oscillators are made.

Any suitable messaging scheme can be employed by the cluster of transmitting communication devices, provided the scheme peg snits the lead communication device to arrange the transmission of the message from the group of transmitting communication devices. By way of non-limiting example, the lead communication device can send a special Request to Send (RTS) message to the neighboring communication devices for transmission to a receiving cluster. When receiving the special Clear to Send (CTS) message from the receiving cluster communication devices, the lead device then initiates transmission of an intended message within a given delay time. The time delay can be synchronized by Time of Day and be directly derived from the Key Generator Transition switching point (i.e., the Epoch). This is the point where the KG is reloaded to generate new non-linear spreading sequences. The time interval, or Epoch, depends on the particular system, and for reference purposes can be set initially to 1 sec.

According to another approach, the device whose position is determined to be closest to the receiving cluster (or an intended receiving communication device within the receiving cluster) may be designated as the lead device. In this case, the transmitting communication devices communicate with one another to obtain a precise geographic location of one of the transmitting communication devices, such as the transmitting communication device closest to the receiving cluster, or the lead device. Such a determination may be made using a variety of methods including use of global positioning system (GPS) data for determining precise geometric coordinates. It should be understood, however, that in general, position information is not necessary for the correct functioning of embodiments of the present invention. Insofar as the time delays from each transmitting station are within the multipath window set by the receiving communication devices, the system will work correctly.

As previously noted, because of the distributed locations of the transmitting communication devices and the varying transmission times, the transmissions from the cluster of transmitting communication devices arrive at the one or more receiving communication devices at different time offsets relative to one another. In accordance with embodiments of the present invention, at each of the one or more receiving communication devices, the signals transmitted from the individual communication devices in the transmitting cluster are essentially treated as though they are different multipath rays of a single transmission, and multipath countermeasures are used to process and combine the received transmissions from the different transmitting communication devices. As will be explained in greater detail hereinbelow, this task is accomplished using a multipath combiner device, such as an equalizer, with the optional addition of a serial probe.

A brief explanation of the phenomenon of multipath fading will aid in understanding operation of present invention embodiments. In terrestrial-based radiowave propagation, multipath interference occurs when reflected rays originating from a radio transmitter arrive at the receiver delayed in time by $\tau_m$ relative to the arrival time of the direct-path ray. The delayed signals will then combine constructively or destructively with the direct-path ray and with each other, depending on their relative phases at the receiver antenna, giving rise to the phenomenon called multipath fading. A simple baseband equivalent model can illustrate the problem. A received signal is given by:

$$r(t)=\Sigma a(t)\exp(-j2\pi f_c \tau_n(t)) \quad (1)$$

where the received signal is the sum of a number of time variant vectors (phasors) having amplitudes a(t) and phases $\theta=2\pi f_c \tau_n(t)$. Note that a change in amplitude requires a large change in a(t), while $\theta$ will change by $2\pi$ every time that $\tau$ changes by $1/f_c$. For example, at frequency $f_c$=2,400 MHz, $1/f_c$=0.5×10$^{-6}$ seconds. Since radio waves travel at approximately one ft/nsec, a path delay at higher frequencies does cause significant changes in the phase of the signal, causing the signal distortion known as multipath fading.

This is further complicated by motion. If the transmitter and receiver are moving with respect to each other, then another key aspect of the multipath fading is the fade rate, which is a function of the relative velocity between the transmitter and the receiver location at points A and B, where A and B are separated by the distance traveled by the receiver at velocity v. The difference in path lengths traveled by a wave due to the movement of the receiver, measured in wavelengths, $\lambda$, yields a phase difference $\Delta\Phi=2\pi\Delta l/\lambda$, where $\Delta l$=v $\Delta t \cos(\theta)$, where $\theta$ is the angle between transmitter/receiver path and the direction of movement. The waves will be exactly at opposite phases at a rate given by the Doppler shift:

$$f_d=(1/2\pi)(\Delta\phi/\Delta t)\cos(\theta)=(v/\lambda)\cos(\theta) \quad (2)$$

Consequently, the signal will have deep fades at the Doppler rate.

Doppler Spread is defined as the frequency interval $f_c$-$f_d$, $f_c$+$f_d$. Coherence Time ($T_c$) and Doppler spread characterize the time varying nature of the channel, caused by the relative motion of transmitter and receiver and by the movement of reflective objects in the channel. The coherence time $T_c$ gives the interval of time over which the fading characteristics will not change (e.g., an equalizer will have to be re-trained at $T_c$ intervals of time). For a velocity of 500 mph, $T_c$=229×10$^{-6}$ seconds.

As will be appreciated from the foregoing explanation of multipath fading, an analysis of a signal-combining system is quite complex for operations in restrictive environments, because the nature of multipath characteristics varies with time. As a result, the transfer function of the transmission medium is time varying, which may be characterized statistically in terms of the coherence bandwidth and time of the channel. To assure analytical tractability, the mathematical model for a signal combining system is described based on the concept of diversity. It is assumed that there are L diversity channels, each carrying the same information-bearing signal. The fading processes among the L diversity channels are assumed to be statistically independent.

The system according to embodiments of the present invention employs a multipath combiner or equalizer, often called a "Rake" receiver. A Rake receiver generally includes parallel correlator circuits which receive signals incoming from different signal paths. In code division multiple access (CDMA) systems, for example, several components are resolved at a resolution equal to the chip period and are coherently combined. Coherent combining of the signals requires that the signals have substantially the same phase and frequency. Thus, in multipath fading environments, instead of losing a signal by destructive interference of multipath components, two or more different path signals are received, and phase adjustment is made to provide constructive combining of these signals.

In order to provide cooperative communications, the transmitting communication devices coordinate transmissions such that the transmitting communication devices transmit the same information-bearing signal on the same communication channel to the distant receiving communication devices with appropriate relative transmission time offsets. This enables the signals to arrive at the communication devices within the receiving cluster all within the Rake multipath processing windows, and be resolvable (or combinable) by the Rake receivers (of those communication devices). As a consequence of the spatial (e.g., transmitting communication device locations relative to the receiving communication devices) and the time diversity (e.g., varying transmission times), the communication devices of the receiving cluster each essentially receive the transmitted signals and treat those signals as though they were different multipath signals. The multipath equalizer or combiner in each receiving communication device determines timing offsets among the received signals, and the received signals are time aligned by phase rotating the signals in accordance with the estimated timing offsets. This is accomplished as long as the received signals are within the multipath processing window of the corresponding Rake receiver and resolvable. The combined signal has a greater signal-to-noise ratio than the individual received signals, permitting detection at a greater range or with a lower bit error rate without having to increase the transmit power of any individual transmitter. Consequently, enhanced signal reception and range performance can be achieved in systems where transmit power is limited by operational constraints or equipment limitations.

The team-to-team (or many-to-many) configuration enables present invention embodiments to be effective, efficient, and versatile for many applications. Due to the team-to-team configuration, present invention embodiments enable two-way communications with enhanced power efficiency for virtually any protocol signaling. For example, a team would be able to cooperatively communicate with a distant team that otherwise would be impossible with the communication devices operating independently. Further, a team would be able to cooperatively communicate with a distant team at a minimal power level for covert, energy-efficient, or high-throughput operations.

Figure 2:
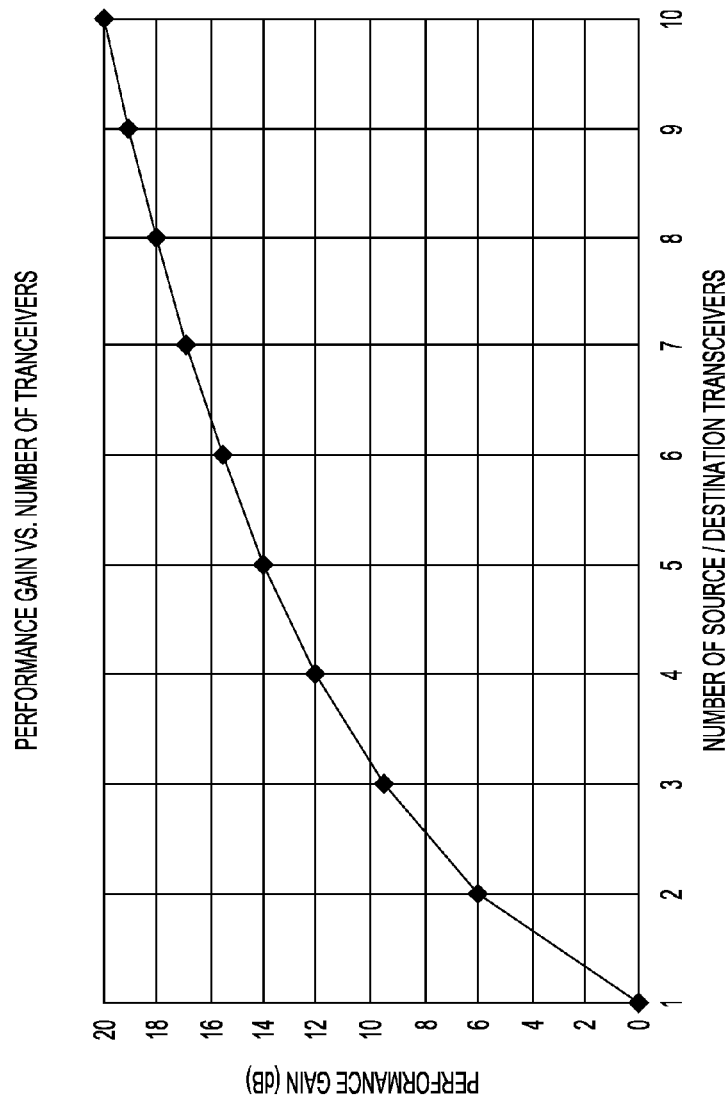
FIG. 2 is a graph illustrating the relationship between the performance gain and the quantity of communication devices employed by embodiments of the present invention.

The performance gain increase attained by present invention embodiments is attributed to signal power gain and array gain. The signal power gain results from multiple signals delivering more transmit power to a receiver, thereby increasing the total amount of energy by the number of transmit signals. The array gain results from focusing the delivered energy in the direction of the receiver (e.g., beamforming) to reduce the energy wasted in other directions. The power gain, $G_{CTC}$, of the cooperative communications technique (e.g., with M as the number of communication devices per team) is measured relative to the single communication device case. The signal power gain in this case is M, and the array gain is also M. Combining these two gains results in a net increase in effective transmit power of up to $M^2$ times. Thus, the power gain, $G_{CTC}$, is the product of these two components, or: $G_{CTC}=M^2$ or $G_{CTC}(dB)=20\log(M)$. FIG. 2 illustrates the estimated performance gain as a function of the number of communication devices in a team.

Applying the cooperative communications concept to applications, the signal power gain (M) may be used to extend the range, while the array gain (M) may be used to increase the data rate. The power gain can be realized by sending signals within the Rake receiver windows of the destination communication devices. Once connected, the phase of the signals may be aligned by communicating the phase alignment information to realize the array gain so as to boost the link throughput.

Figure 3:
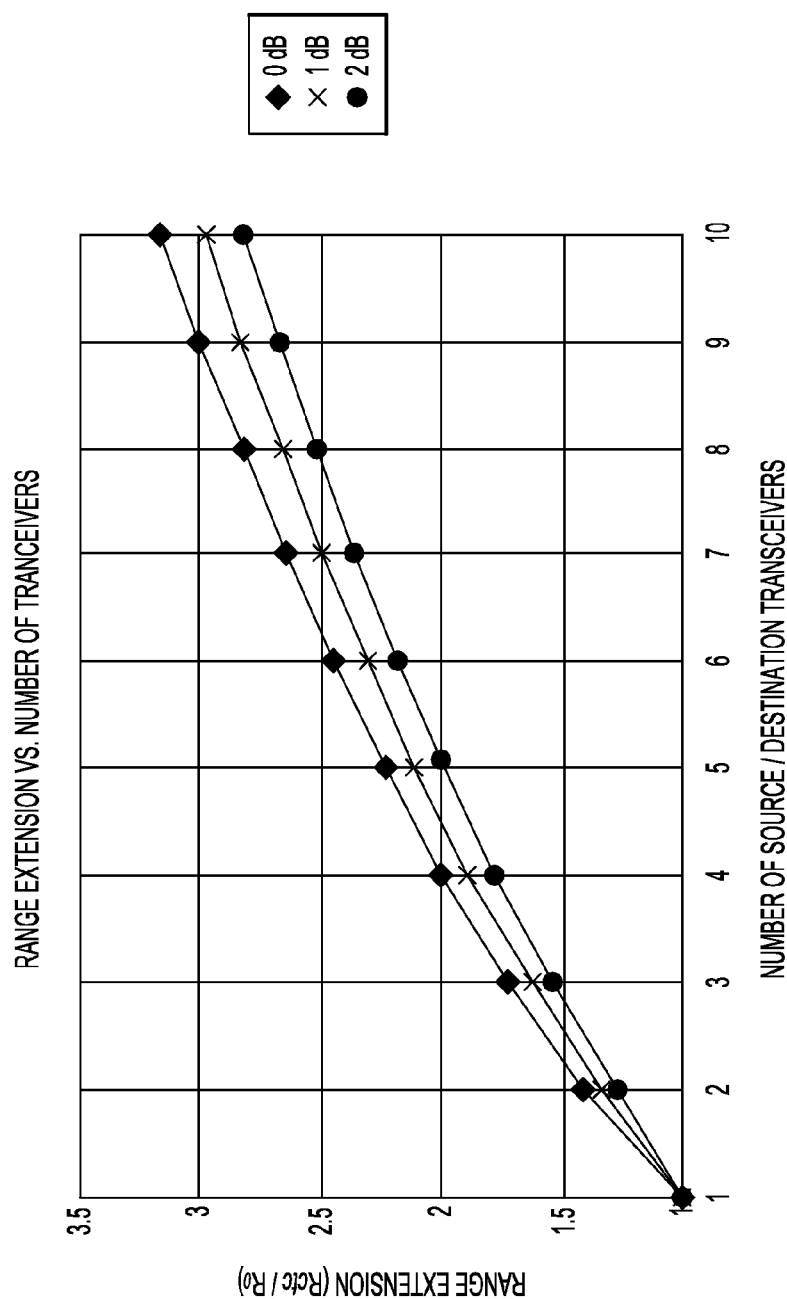
FIG. 3 is a graph illustrating the relationship between the range extension performance and the quantity of communication devices employed by embodiments of the present invention.

Using the $4^{th}$ power representation for propagation losses, the range extension, $R_{CTC}$, of the cooperative communications relative to the single communication device case may be shown as $R_{CTC} \cong M^{0.5}$. FIG. 3 illustrates the estimated range extension capability as a function of the number of communication devices in a team and parameterized as the implementation loss ranging from 0-2 dB.

It should be noted that realizing the signal gain does not require precise timing between transmit signals, so long as the signals arrive at the receiving communication devices within the processing window of their Rake receivers. On the other hand, realizing array gain requires more precise phase alignments between the transmit signals, which may require a closed-loop phase adjustment mechanism to accomplish significant array gains.

In accordance with an example embodiment of the present invention, the Rake receiver within the communication devices employs a tapped delay line through which the received signal is passed. The signal at each tap is properly weighted and summed, in effect, to collect the signal energy from all the received signal paths that fall within the span of the tapped delay line and carry the same information. Note that significant gains can be realized as long as phase errors among the received signals can be maintained within 90 degrees.

Figure 4:
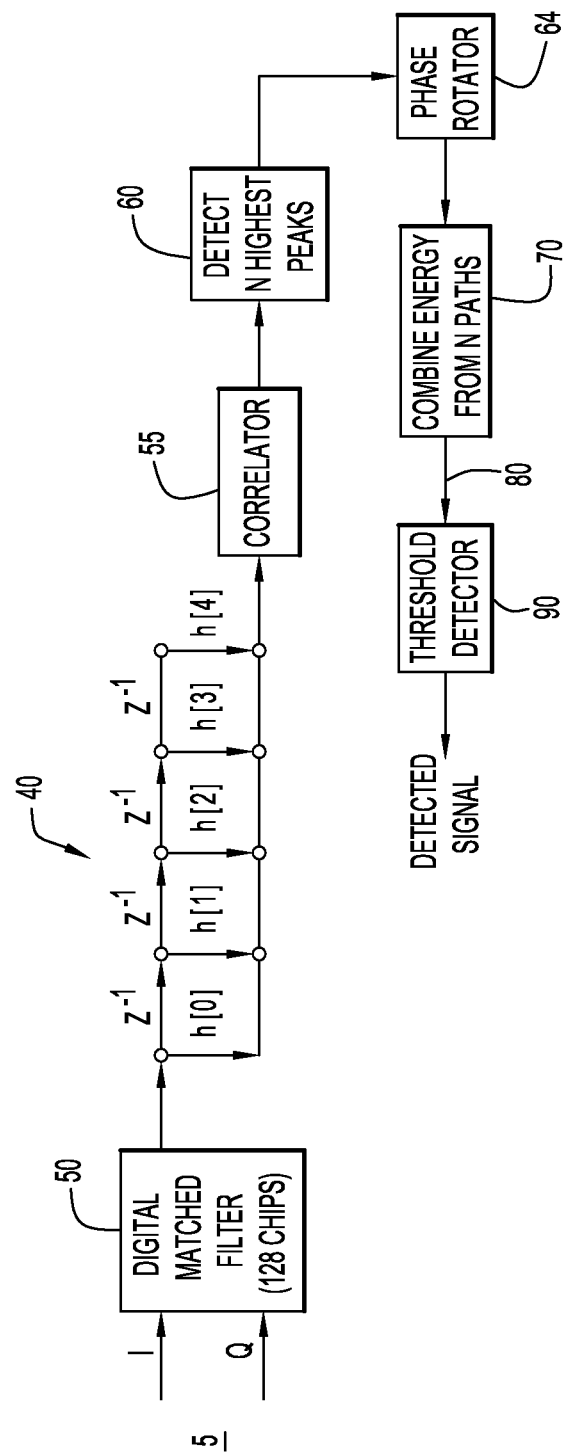
FIG. 4 is a schematic block diagram of a synchronous combining receiver of a communication device according to an embodiment of the present invention.

A schematic block diagram of a receiver system of communication device 10 (preferably implemented by receiver 24 and/or processor 26) according to a present invention embodiment is shown in FIG. 4. A front end of the receiver system (not shown) is coupled to an input terminal 5. The front end of the receiver system may include a tuner and intermediate frequency (IF) stage, an analog-to-digital converter, and a 90 degree phase shifter coupled together in a known manner to produce various clock signals required by circuitry in the receiver system in synchronism with the received signal. The timing reference generator and clock recovery circuit may also be located after the multipath equalizer.

The receiver system front end digitizes the IF signal to produce an in phase (I) component and then rotates the digital signal to obtain the quadrature (Q) component, and the digital I and Q components are received at the input terminal 5. The I and Q signals are supplied to a digital matched filter 50 whose output is supplied to the multipath equalizer or combiner comprising a plurality of tap delay lines 40 (each associated with a correlation window) for receiving each of the phase shifted data communication signals (in the windows). Each tap delay line has corresponding weighting coefficients h[0], h[1], . . . h[m] associated with each of the received channels for adjusting the amplitude and phase of the received signal in order to equalize the signals. Each of the tap delay lines is coupled to a correlator 55 for providing a correlation signal indicative of the amount of correlation among the received time delayed signals. The peaks of the correlation signal are detected in a detector 60 which is coupled to phase rotator 64 for rotating the phase of the detected peak signal to allow for coherent combination. Detector 60 detects the N highest peaks received from correlator 55. In general, any practical number of peaks N which exceeds a given threshold can be detected up to the total number of peaks. Unless limited by hardware or processing considerations, it is preferable to select and process all peaks exceeding a given threshold; however, in certain circumstances it may be preferable to specify a predetermined maximum number of peaks to be processed.

The phase-rotated signals produced by phase rotator 64 are received by a combiner 70 which coherently combines each of the detected peak signals to produce a combined output 80. Phase rotator 64 essentially time aligns the separate signals by ensuring that the relative phases of the signals are within a certain number of degrees of each other, such that a significant integration gain will result when the signals are coherently combined. A threshold detector 90 compares the combined signal 80 with a predetermined threshold to determine whether or not a true signal is present. The combined detected signal has a gain exceeding that of each of the individual data communication signals, and is indicative of the data communication signal.

The Rake receiver operates on each of the received data communication signals from the transmission of the transmitting devices as if the transmissions were multipath signals from a particular source. Embodiments of the present invention utilize such information to enhance the gain by combining these signals in synchronous fashion. In a practical implementation, important aspects of the system include the use of Direct Sequence Spread Spectrum (DSSS) and a Digital Matched Filter (DMF). The DSSS expands the data pulse bandwidth with a secondary modulation called chipping. For example, with a 1 MHz (Megabits per second) signal spread with a 32 MHz chipping signal the symbol duration is $T_s=1$ μsec, and a chip duration $T_c=31.25$ nsec. Consequently, each stage in the DMF is 31.25 nsec apart, such that different signal paths separated by at least 31.25 nsec will be recognized.

Another important aspect of a present invention embodiment is that the signal is sampled at the Nyquist rate (e.g., two times the chipping rate, or 64 MHz), such that the system produces one output of the DMF at the sampling rate (e.g., 64 MHz, meaning that each 15.625 nsec there will be an output). Over a period of 1 microsecond (μsec), there are 64 outputs and, over a period of 0.250 μsec, there are 16 outputs, which is consistent with the synchronization speed of practical systems. Theoretically, all these outputs can be combined with a Digital Filter (Finite Impulse Response). This FIR would then be an "equalizer", since having a definite mathematical relationship between the input and the output impulse responses of an equalizer FIR makes it indeed an equalizer. However, embodiments of the present invention do not require a true equalizer. In accordance with another implementation, heuristic "combining" can be used (e.g., phase matching and adding the magnitude of selected paths). The combining approach can be advantageous where hardware limitations or costs are a consideration. The particular combining/equalization method is not critical. An equalizer combiner will produce better results than a non-equalizer combiner; however, within a given signal to noise ratio limitation both approaches work.

The serial probe provides an instantaneous measure of the channel impulse response at the coherence time intervals. Essentially, the serial probe involves a sequence of known pulses which can be identical to the synchronization sequence which can be used to determine how the signal was distorted in the channel. The channel impulse response accounts for the relative motion, not only between the receiving and the transmitting communication devices, but the relative motion between the transmitting communication devices within a cluster. The serial probe provides information to set the Rake combiner tap weights (this can be understood as the coefficients in a Finite Impulse Response (FIR) filter). This minimizes the losses due to channel variability as well as frequency offsets due to Doppler shifts. The serial probe is not strictly necessary for the system of present invention embodiments to operate correctly; however, performance is degraded without the serial probe.

The serial probe is preferably identical to the synchronization sequence in the transmitted message, for example, sixteen words of 4 μsec duration each. The chip pattern changes according to the KG Epoch; however, the underlying symbol pattern can remain the same or change with the Epoch as required for different missions. The symbol pattern is an M-Sequence generated by a Linear Sequence Generator, e.g., 16, 12, 3, 1.

The serial probe is inserted at intervals determined by the Coherence Time. This is the time over which the channel impulse response is invariant, and it is dependent on frequency given by:

$$T_c = \sqrt{\frac{9}{16\pi f_m^2}}$$

The serial probe is processed at these intervals and all the subsequent symbol inputs are processed with the information (tap weights) derived from the last probe. The serial probe is also used to resynchronize the system (e.g., the peak correlation output of the probe sets the initial time $t_o$ for the subsequent symbols).

According to an example embodiment of the present invention, the Rake receiver system may be embodied within a digital radio. For example, such a system may comprise a burst packet local area network having a layered architecture, where communications are established at the applications level and remain until one of the participants terminate it. Such a transmitter and receiver system may utilize a frequency or code division multiple access communications scheme (or both) comprising a combination of channel sense multiple access/collision avoidance (CSMA/CA) and code division multiple access (CDMA) techniques for enhancing system throughput.

In this example embodiment, by way of non-limiting example, four 20 MHz channels are available within a 2400-2800 MHz frequency band and several signals may be superimposed within the same time bandwidth, through the use of appropriate spreading codes. Note that, in the transmitter and receiver system described above, signaling comprises two different modulations; data modulation and spreading modulation. A modem operable within the transmitter/receiver system spreads the baseband signal (not the up converter frequency) with a quadrature modulation, such that the bandwidth can be contained within 20 MHz. The data modulation comprises a binary phase shift key (BPSK) sequence, while the spread modulation is an offset quadrature phase shift key (OQPSK) having 16 megachips per second (Mcps) for the in-phase component and 16 Mcps for the quadrature component.

Figure 5:
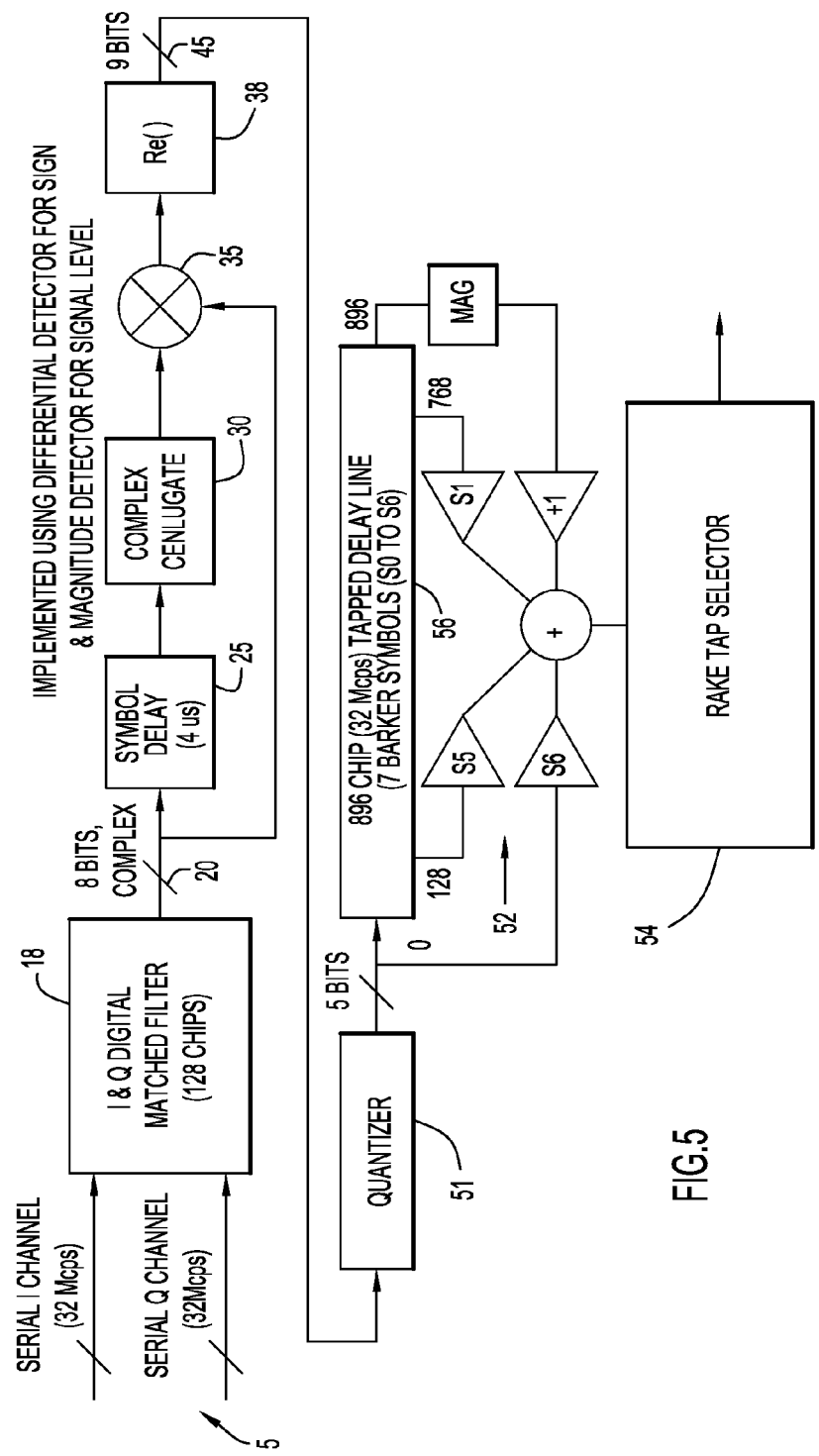
FIG. 5 is a more detailed circuit diagram of the differential detection tap delay and Rake tap selection processing of the synchronous combining receiver according to an embodiment of the present invention.

FIG. 5 is a more detailed block diagram of the Rake receiver system components illustrating differential detection tap delay and the Rake tap selection processing implemented within the device of the example embodiment for acquiring and estimating signal channels to adaptively control network communications for enhancing the gain of received signals. Referring to FIG. 5, in phase (I) and quadrature (Q) channel signals are supplied to digital matched filter 18 to provide pulse shaping of the input signal. Output signal 20 from filter 18 comprises an 8 bit complex data sequence which is delayed (module 25) and the complex conjugate obtained via module 30. The complex conjugate output is then multiplied (module 35) with signal 20 and the real part 45 of the signal is produced by module 38. Signal 45 is received by a quantizer 51 which quantizes the signal to 5 bit values, and an 896 chip (32 Mcps) tapped delay line 52 using weighted taps operates to perform the multipath equalization. Rake tap selection processor 54 is responsive to the output of tapped delay line 56 for performing threshold detection and acquisition.

Figure 6:
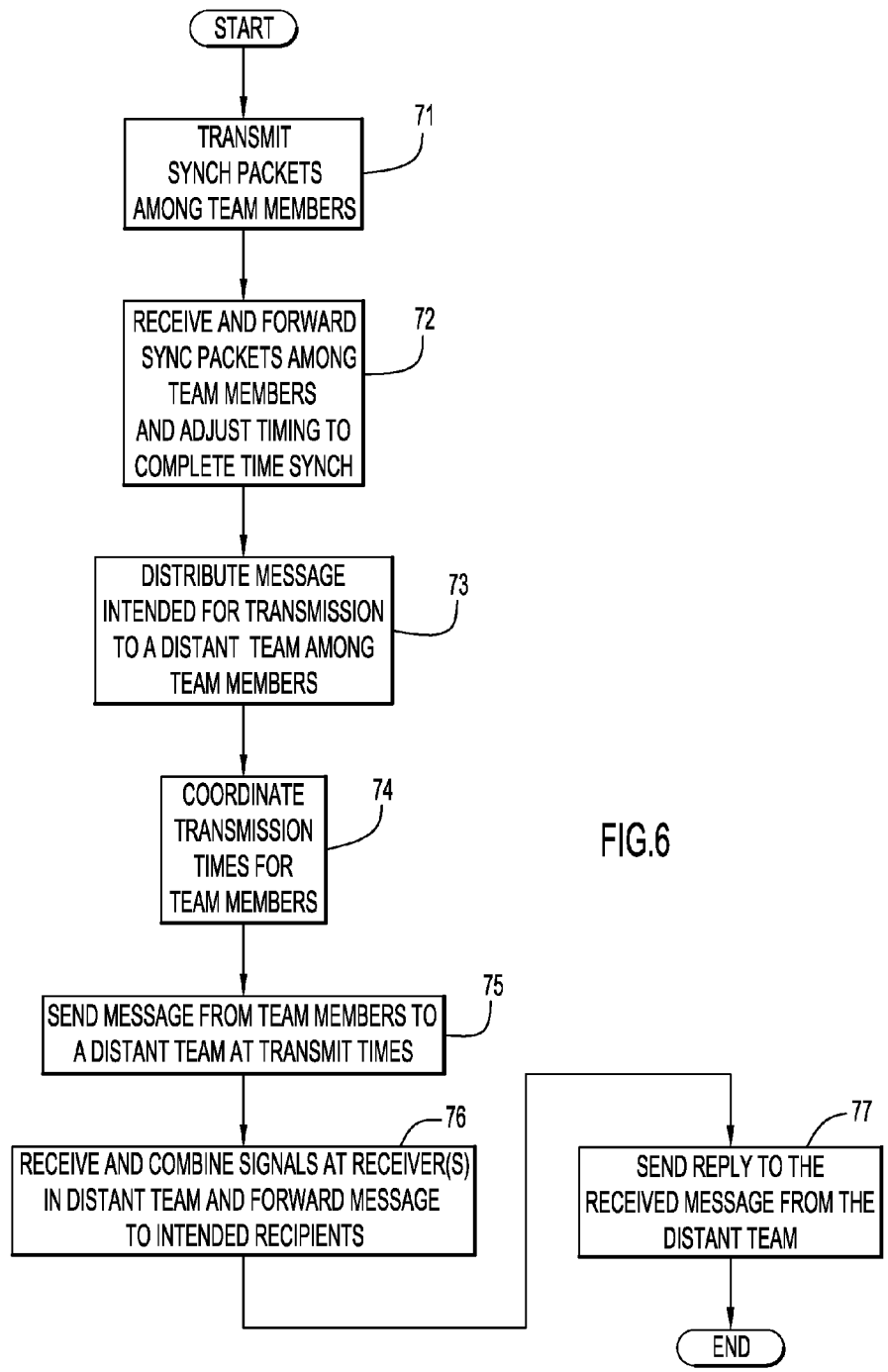
FIG. 6 is a procedural flow chart illustrating the manner in which cooperative communication is performed between teams of communication devices according to an embodiment of the present invention.

The manner in which cooperative communication is performed between teams of communication devices is illustrated, by way of example, in FIGS. 1 and 6. Initially, each team 15*a*, 15*b* comprises a group of communication devices 10 (e.g., radio equipped personnel or systems linked in a common purpose), where the cooperative communication is preferably controlled by processor 26 of the communication devices. The communication devices are especially appropriate for conducting tasks that are high in complexity and have many interdependent subtasks. The communication devices may further be coordinated to synchronize the system network time, transmit timing, and transmit the same information-bearing signal to destination communication devices in another team. Cooperative communication utilizes special communications addresses, where each team 15a, 15b has a special address that is utilized for two-way operation. The special address is inserted in a special header to enable the header to wrap around a common message body to be sent.

In particular, the transmitting communication devices in team 15a coordinate their respective transmit times such that the same information-bearing signals arrive at the one or more destination communication devices in team 15b within a narrow time window that allows each of those destination communication devices to constructively combine the plural signals as described above. A source communication device 10 initiating the transmission within team 15a starts transmitting Late Net Entry (LNE) packets that contain the network time (e.g., Time of Day (TOD)) to all other communication devices in the team at step 71. The communication devices within team 15a receive the LNEs and adjust their timing to the network time at step 72. The communication devices further forward the received LNEs until the whole team is synchronized, thereby completing the time synchronization between the communication devices of team 15a.

The source communication device sends an intended message to the other communication devices within the team at step 73, and coordinates the times for transmission of the message by each of the team communication devices at step 74. The communication devices of team 15a coordinate transmissions such that the communication devices of transmitting team 15a collectively transmit the same information-bearing signal on the same communication channel to the distant destination communication devices with appropriate relative transmission time offsets as described above. This enables the transmitted signals to arrive at one or more destination communication devices of team 15b within the Rake multipath processing windows, and be resolvable by the Rake receivers of those destination communication devices. The varying transmission times (ore transmission time offsets) are determined by the source communication device and conveyed to the transmitting team members. The transmission time offsets may be of any suitable values providing sufficient time differences between reception of signals at the one or more receiving communication devices to prevent more than one signal from arriving within the same chip window to thereby enable resolution of those signals. Accordingly, the transmission time offsets for the transmitting communication devices include time values that are preferably separated by at least one chip. For example, the transmission times of the transmitting communication devices may be two chips apart from one another (e.g., the transmission time offset may be equal to two chips). The receiving communication devices in these instances will be able to synchronize with the incoming synchronization sequence of the transmitted signals. However, the transmission times (or transmission time offsets) may be of any desired values, and may be separated by (or may be) any suitable time intervals (e.g., including any multiples or parts of a chip, etc.) sufficient to enable resolution of the signals. The transmission times (or transmission time offset) may be determined by the initiating or other transmitting communication devices in any fashion (e.g., predetermined, algorithmic or formulaic determination, etc.), and are preferably based on the conditions and/or constraints of a particular application. Once the communication devices of team 15a receive the message from the source communication device, the communication devices of team 15a transmit the messages at the corresponding transmission times to the communication devices of team 15b at step 75. The receiving communication devices each receive the transmitted signals, and treat them as multipath reflections to acquire the transmitted message at step 76 in substantially the same manner described above. The receiving communication devices determine the one or more intended recipients of the message (e.g., unicast, multicast or broadcast message) based on information or an address within the message, and forward the message to those intended recipients.

In addition, any two-way protocol or messaging may be performed, where the destination communication devices of team 15b may cooperatively send a message (in the form of the same information-bearing signals) back to the communication devices of team 15a at step 77 in substantially the same manner described above. This enables the signals to arrive at the communication devices of team 15a within a narrow time window that allows each recipient to constructively combine the plural signals, and acquire the message. The above process may be repeated until communication between teams 15a, 15b is completed.

Any of a variety of transmission protocols or schemes can be used to transmit signals between a cluster of communication devices and a distant cluster of communication devices receiving the combined signals. By way of non-limiting example, the communication devices can communicate with each other via packet transmission using a carrier sense multiple access with collision avoidance (CSMA/CA) scheme. With CSMA/CA, each packet transmission between two communication devices typically involves an exchange of four short bursts. First, a request to send (RTS) message is sent from the sending device to the receiving device. The receiving device then responds upon receipt of the RTS message with a clear-to-send (CTS) message. A data (MSG) message is then transmitted from the sending device, and an acknowledgment (ACK) message is sent from the receiving device upon reception of the data message. If the data message is not successfully received, the receiving device can send a no acknowledgment (NAK) message back to the sending device, or simply not send any message within a time out period, indicating to the sending device that the data message was not successfully received.

Figure 7:
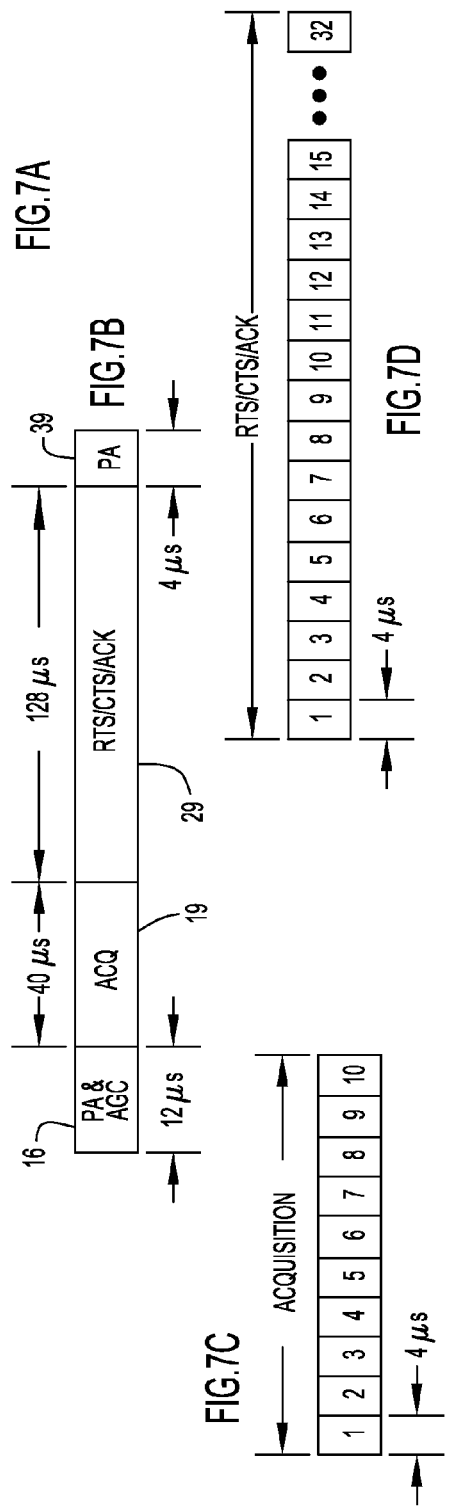
FIGS. 7A-7D illustrate formats for RTS/CTS/ACK data packets used for CSMA/CA message transmission in accordance with an example embodiment of the present invention.

FIGS. 7A-7D illustrate exemplary formats for the RTS/CTS/ACK data packets used for message transmission. The RTS/CTS/ACK acquisition sequences comprise ten 4 μsec. symbols as shown in FIG. 7A. Referring to FIG. 7B, acquisition data portion 19 is approximately 40 μsec. in duration, while the RTS/CTS/ACK message portion 29 is approximately 128 μsec. A power amplifier (PA) and automatic gain control (AGC) header portion 16 of 12 μsec. in duration provides gain control information at the beginning of the message, while PA tail portion 39 having a 4 μsec. duration provides end of data information (amplifier rise and settle times). The RTS/CTS/ACK message portion 29 is provided in greater detail in FIG. 7D. FIG. 7D shows the 32 bit sequence where each bit element has a duration of 4 μsec. The acquisition data sequence 19 is further illustrated in FIG. 7C, which shows a 10 symbol sequence having a temporal duration of 4 μsec per symbol.

In a DSSS system where each symbol is spread with different spreading sequences, the multipath window can cover several symbols. If the symbols were spread with the same sequences, then multipath rays which are delayed more than one symbol cannot be combined, since this would present the risk of combining two different symbols (virtually destroying them). In the system of a present invention embodiment, with different spreading sequences for each symbol, a reflected component of symbol $S_K$ which will produce a correlation peak only with reference $R_K$. Thus, the reference is kept for as long as the desired length of the multipath window.

As can be seen from the diagram of FIG. 7A, the first bit or symbol b1 within the sequence represents a reference bit, while bits two and three are indicative of the message type (e.g., RTS, CTS, or ACK). The next seven bits (b4-b10) indicate the destination address (for RTS) or source address (for CTS and ACK) messages. The RTS message further includes the message data rate (bits b11, b12), message length (b13-15), suggested message channel (b16-18), and noise control bits (b19-20). A 5 bit packet priority and 7 bit source ID are then appended to the RTS message spreading sequence.

In similar fashion, the CTS message portion further includes a message data rate (2 bits), message length (3 bits), message channel direction (2 bits), power control portion (3 bits), FEC portion (2 bits), and a destination ID (7 bits). Three spare bits (b23-26) are also included within the CTS message type. Finally, the ACK message includes an indication of the link quality (3 bits, b11-13), and a 12 bit network processor writable and spare capacity segment, in addition to the 7 bit destination ID.

Thus, FIGS. 7A-7D illustrate the communication protocol used among transmitter and receiver devices for communicating over 16 MHz signal bandwidths (20 MHz including the guard band). Note that the communication process identified above terminates a transmission between the receiver and transmitter, even though the two terminals are still connected at the application level. In this manner, each packet is transmitted independently of all the other packets, so that there is no signal in the air that indicates that the receiver and the transmitter are connected in any way. This advantageous feature minimizes the potential for eavesdroppers to detect and/or identify the location of the transmitting and receiving devices. Note however, that the packets do include sequencing information to allow the receiver to reconstruct the entire message.

Figure 8:
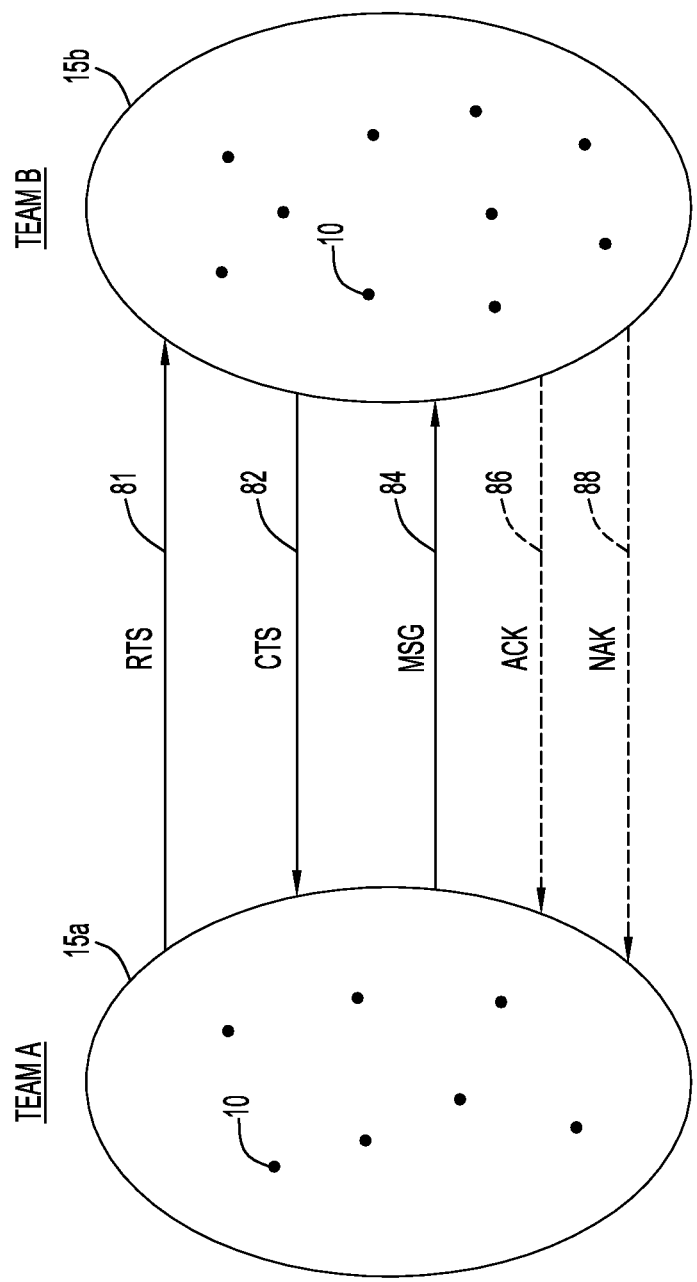
FIG. 8 is a diagrammatic illustration of the manner in which cooperative communication is performed between teams of communication devices in accordance with a communication protocol according to an embodiment of the present invention.

The team-to-team (or many-to-many) configuration of present invention embodiments enables a communication protocol to be maintained without modification of the protocol or termination (or interruption) of a protocol message sequence. For example, in the case of a single receiver, the receiver may receive the transmitted message, but may not have sufficient transmission power or otherwise be able to timely return a reply, thereby prematurely terminating a protocol message sequence. Embodiments of the present invention maintain a communication protocol sequence and provide immediate replies during a message sequence. An example of cooperative communications of a present invention embodiment maintaining a communication protocol is illustrated in FIG. 8. Initially, the cooperative communications are preferably controlled by processor 26 of communication devices 10. Specifically, a source communication device 10 within team 15a desires to send a message to one or more receiving communication devices 10 of team 15b. By way of example only, the teams are implementing the CSMA/CA protocol described above; however, any suitable communication protocol may be employed. With CSMA/CA, each packet transmission between communication devices typically involves an exchange of four short bursts (e.g., RTS, CTS, MSG and ACK/NAK) as described above. The source communication device coordinates transmission times among the communication devices of team 15a as described above. A request to send (RTS) message (FIG. 7A) is generated and transferred to the communication devices of team 15a for transmission. The message includes an address or type of service field indicating that the message is of a type for cooperative communications, and may further include an identifier indicating the intended or desired team or teams to receive the RTS message.

The request to send (RTS) message is sent from the communication devices of team 15a at their corresponding transmission times at flow 81 in substantially the same manner described above. One or more communication devices within team 15b each receive all of the transmitted signals, and combine these signals as described above to produce the transmitted RTS message. These communication devices synchronize to Time of Day (TOD) as described above, and include predetermined time offsets for transmission of reply signals for the communication protocol to team 15a. Each communication device within team 15b receiving the RTS message examines the special addressing to determine that the RTS message has been sent by cooperative communications. When the RTS message has been sent via cooperative communications, the communication devices know the communication protocol scheme, and each automatically responds at flow 82 by transmitting a clear-to-send (CTS) message (FIG. 7A) at the corresponding transmission time without coordinating the transmission with the other communication devices. This enables the teams to provide an immediate response to the RTS message and maintain the communication protocol without termination or modification of that protocol. The CTS message includes an address or type of service field indicating the message is of a type for cooperative communications, and may further include an identifier indicating the desired or intended team or teams to receive the CTS message.

One or more communication devices within team 15a each receive all of the transmitted signals from team 15b, and combine these signals as described above to produce the transmitted CTS message. Each communication device within team 15a receiving the CTS message examines the special addressing to determine that the CTS message has been sent by cooperative communications. Subsequently, the source communication device conveys a data (MSG) message to the other communication devices of team 15a, and the data message is transmitted by the communication devices at their corresponding transmission times at flow 84.

One or more communication devices within team 15b each receive all of the transmitted signals, and combine these signals as described above to produce the transmitted MSG message. Each communication device within team 15b receiving the MSG message examines the special addressing to determine that the MSG message has been sent by cooperative communications. When the MSG message has been sent via cooperative communications, the receiving communication devices forward the received message to one or more intended recipients based on one or more destination addresses within the data message. Further, the receiving communication devices know the communication protocol scheme, and each automatically responds at flow 86 by transmitting an acknowledgement (ACK) message (FIG. 7A) at the corresponding transmission time without coordinating the transmission with the other communication devices. If the data message is not successfully received at team 15b, the receiving communication devices can send a no acknowledgment (NAK) message at flow 88 back to team 15a, or simply not send any message within a time out period, indicating to team 15a that the data message was not successfully received.

Every communication device within teams 15a, 15b is typically not needed to receive a transmission signal. For example, a team may need to receive a message by a quantity of communication devices collectively providing sufficient transmission range for a reply (e.g., if a cluster includes ten communication devices and four of those communication devices are required for collectively transmitting a reply, then reception by at least any four of those communication devices should be sufficient). In the case where less than the sufficient quantity of communication devices receive a message, the message may be considered to not have been received, or the receiving communication devices may trigger the other communication devices within a team to transmit the reply at the corresponding transmission times as described above. Thus, a communication protocol may be employed without modification via cooperative communications of present invention embodiments by maintaining the timing required for the transmissions.

Figure 9:
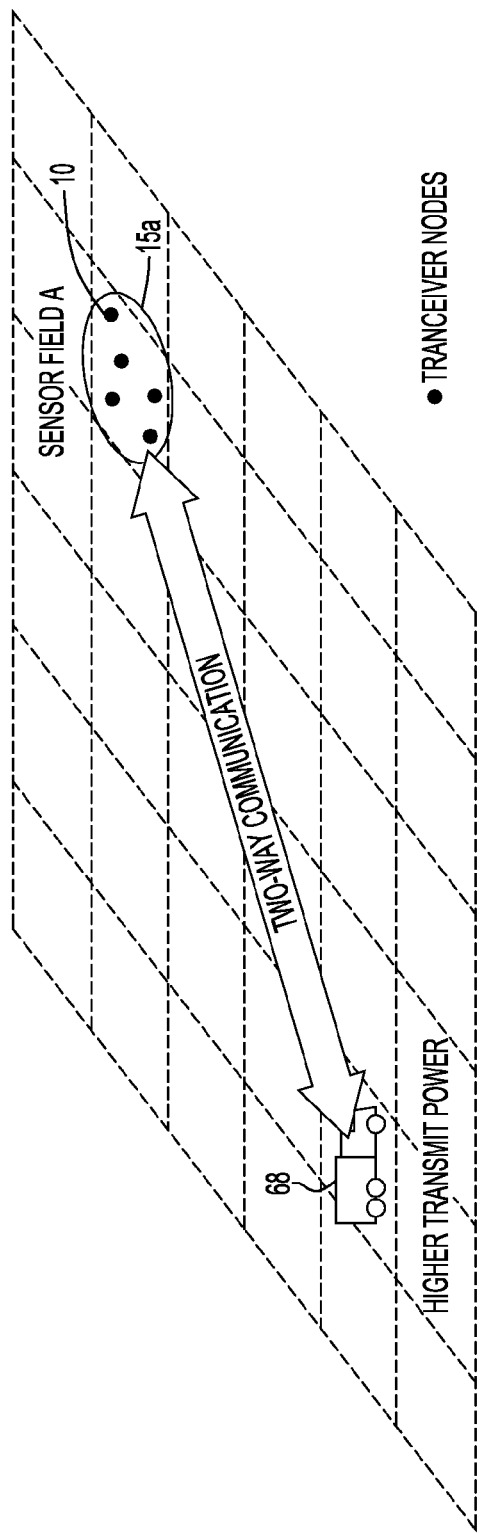
FIG. 9 is a conceptual representation of the technique in which communications may be extended for communication/sensing devices according to an embodiment of the present invention.

It should be understood that present invention embodiments are not limited to any particular protocol, messaging scheme, or type of channel access, and are useful in any context or network that would benefit from an increase in the power of received signals resulting from the combined power of distributed transmitters. The signal interchanges would preferably be cooperatively sent to ensure that the signal interchanges are within the multipath processing window of destination communication devices. For example, FIG. 9 illustrates enhanced range being provided due to employment of cooperative communication between a team 15a (e.g., Sensor Field A as viewed in FIG. 9) including a plurality of communication/sensing devices 10 and a destination command and control vehicle 68. The communication/sensing devices collectively transmit information to enhance the range, while vehicle 68 receives and combines the transmitted signals to perform the cooperative communication. The transmission and reception of the signals are performed in substantially the same manner described above.

Further, consider a network of communication devices which transmit with very low power due to cost, power and/or RF emissions considerations. While many if not all of the communication devices in the network may be within each other's fields of view, the power limitations may make direct communications between certain devices impossible. One conventional solution to this problem would be to relay messages using intermediate devices in the network. In accordance with an embodiment of the present invention, another approach is for the device from which the message originates to command devices within its operating range to simultaneously transmit signals containing the same message, such that the intended receiving devices, which may not be within the operating range of the originating device alone, is nevertheless within the extended reception range resulting from combining the signals of the group of transmitters. In this manner, the technique of present invention embodiments may avoid delivering the signal via multiple "hops" (e.g., through multiple intermediate devices), and may potentially simplify signal routing algorithms and reduce the need for routing tables in certain types of networks.

Figure 10:
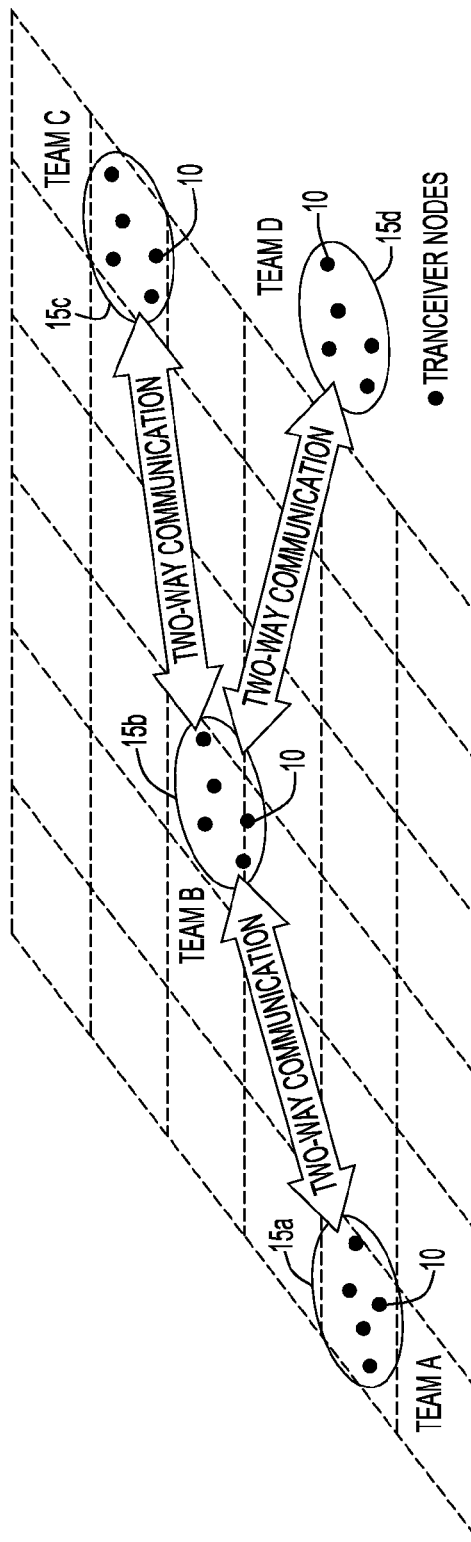
FIG. 10 is a conceptual representation of the technique in which communications may be extended through intermediate teams of communication devices according to an embodiment of the present invention.
Figure 11:
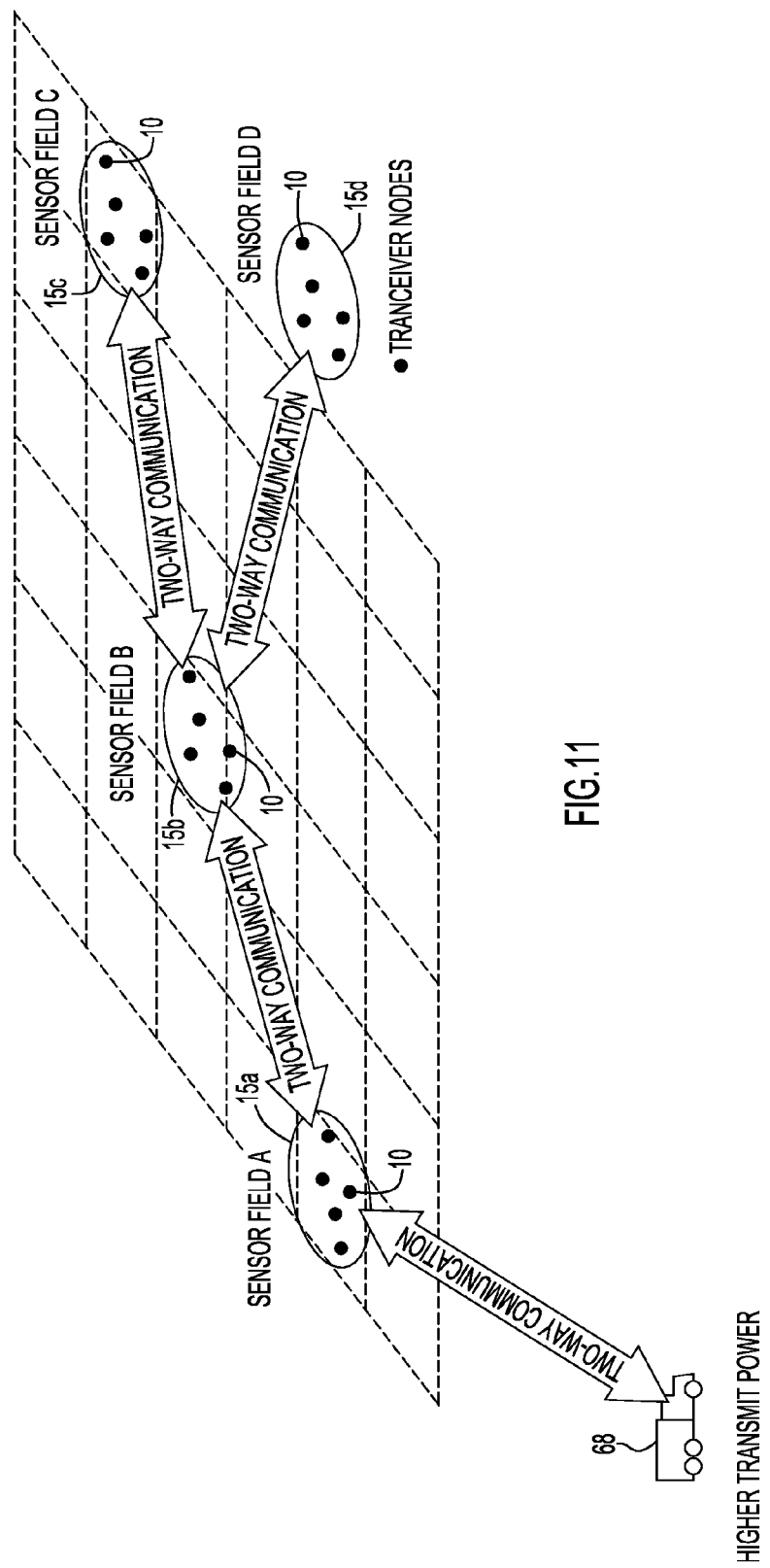
FIG. 11 is a conceptual representation of the technique in which communications may be extended through intermediate teams of communication/sensing devices with merging of data according to an embodiment of the present invention.

Alternatively, the cooperative communication may be utilized to transmit messages through intermediate teams or clusters as illustrated in FIGS. 10 and 11. Referring to FIG. 10, teams 15a (e.g., TEAM A as viewed in FIG. 10), 15c (e.g., TEAM C as viewed in FIG. 10), and 15d (e.g., TEAM D as viewed in FIG. 10) each include a plurality of communication devices 10, and may cooperatively communicate with each other through communication devices 10 of team 15b (e.g., TEAM B as viewed in FIG. 10). In this case, the teams cooperatively communicate (transmit and receive) in substantially the same manners described above. A similar mode of operation is present in FIG. 11, where communication/sensing devices 10 of team 15b (e.g., Sensor Field B as viewed in FIG. 11) communicate with command and control vehicle 68 via communication/sensing devices 10 of team 15a (e.g., Sensor Field A as viewed in FIG. 11), and communication/sensing devices 10 of teams 15c and 15d (e.g., Sensor Fields C and D as viewed in FIG. 11) communicate with a destination via teams 15a and 15b (e.g., Sensor Fields A and B as viewed in FIG. 11). In this case, the information from teams 15a, 15b, 15c and 15d (e.g., Sensor Fields A, B, C, and D as viewed in FIG. 11) may be merged or fused in any fashion prior to forwarding from intermediate teams 15a, 15b (e.g., Sensor Fields A and B as viewed in FIG. 11) that receive or contain the sensor field information.

The signal combining technique of present invention embodiments has applicability in the context of military or covert field operations. For example, a squad of soldiers or a reconnaissance team equipped with radios may be required to transmit using very low power levels to minimize the risk of being discovered by hostile forces or revealing their location. At such power levels, reliable communications may be difficult to achieve between individual radios in the squad and one or more receivers located at a considerable distance from the squad. In accordance with a present invention embodiment, range performance can be enhanced in this scenario without increasing the transmit power of individual radios in the squad by transmitting the same signals from some or all of the radios in the squad at designated transmission times offset from one another, and combining the signals at each of one or more distant receivers.

It will be appreciated that the embodiments described above and illustrated in the drawings represent only a few of the many ways of implementing a method and apparatus for cooperative communications between groups of communication units.

The communication networks may be of any type (e.g., wireless, wired, mobile, stationary, Ad-Hoc, any combinations thereof, etc.), and include any quantity of teams or clusters arranged in any fashion and disposed at any suitable locations. The teams or clusters may include any quantity of any types of communication devices, where the communication devices may be arranged within the clusters in any fashion and within any suitable geographic proximity (e.g., the cluster may encompass an area of any size or shape). Any quantity of communication devices within a team may receive and combine transmitted signals, or may transmit a desired message. The power level for transmission may be adjusted based on the particular distance to the receivers. For example, in the case where receivers are located at a distance less than the transmission range of the transmitting cluster, the transmission power level of one or more of the transmitting communication devices may be reduced accordingly (e.g., due to the increased levels from collective transmissions). Any communication devices within a cluster may initiate and/or transmit a message. Similarly, any communication devices within a cluster may receive and combine the transmitted signals. The communication devices may communicate via any suitable communications medium (e.g., wireless communication devices, etc.).

The communication devices may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The receivers are preferably Rake type receivers to combine and resolve the transmitted signals. The communication devices may include any quantity of independent transmitting and/or receiving devices, may utilize any quantity of frequency channels of any desired frequencies and may send any type of data. The communication devices may further include any quantity of any types of devices (e.g., processors, image capture, sensors, speakers, microphone, keypad, etc.) for a particular application. The communication devices may further include any quantity of any types of input or control devices (e.g., buttons, switches, etc.) to enter voice or data and control device operation, where the devices may be in the form of any type of radio unit or other communications device.

The processor of the communication devices may be implemented by any conventional or other microprocessor, controller or circuitry to perform the functions described herein, while any quantity of processors or processing devices or circuitry may be employed within the communication devices, where the processor functions may be distributed in any fashion among any quantity of hardware and/or software modules or units, processors or other processing devices or circuits. The software for the processor of the communication devices may be implemented in any suitable computer language, and could be developed by one of ordinary skill in the computer and/or programming arts based on the functional description contained herein and the flow charts and diagrams illustrated in the drawings. Further, any references herein of software performing various functions generally refer to processors performing those functions under software control. The software and/or algorithms described above and illustrated in the flow charts and diagrams may be modified in any manner that accomplishes the functions described herein. The communication devices may alternatively include any components arranged in any fashion to facilitate information transfer in the manner described above.

The software of the present invention embodiments may be available on a program product apparatus or device including a recordable or computer usable medium (e.g., magnetic or optical mediums, magneto-optic mediums, floppy diskettes, CD-ROM, DVD, memory devices, etc.), and/or may be downloaded (e.g., in the form of carrier waves, packets, etc.) to systems via a network or other communications medium.

The communication devices may employ any conventional access scheme or protocol to access and/or transmit information. The messages (e.g., RTS, CTS, ACK, NAK, LNE, MSG, etc.) may be of any size, may have any format and may contain any desired information. The messages may be transmitted via any transmission scheme or communication protocol (e.g., CDMA, CSMA, etc.). The various messages may include any identifier of any suitable indicia (e.g., symbols, alphanumeric or other characters, etc.) to identify the type of message. The messages may be transmitted in any fashion (e.g., broadcast, multicast, unicast, etc.).

The receiver system may be implemented by any conventional or other components (e.g., matched filter, tapped delay line, correlator, detector, phase rotator, energy combiner, threshold detector, symbol delay, complex conjugate, multiplier, real component, quantizer, tap selector, etc.). These components may be implemented by any quantity of any combination of hardware and/or software units or modules. The detector may detect any quantity of peaks, and utilize any suitable threshold for detecting the peaks. The equalizer or combiner may include any quantity of tap delay lines each associated with weighting coefficients or taps of any desired values. The tap delay lines may be associated with correlation windows or time intervals of any suitable time durations (e.g., any multiples or portions of chips, etc.) to receive and resolve the transmitted signals. The threshold utilized by the threshold detector may be of any suitable value or within any suitable range, while the phase rotator may adjust the phase of the signals to be within any suitable phase difference or range.

The transmission times (or transmission time offsets) of the transmitting communication devices may be set to any desired values enabling the transmitted signals to be constructively combined at the receiving communication devices. Basically, the transmission times (or transmission time offsets) should be set to values that enable each (or substantially each) of the transmitted signals to fall within a different correlation window of the combiner or equalizer (e.g., a correlation window of a different tap delay line, etc.). This permits the signals to be resolvable by the receiving communication devices since a single signal is present within each correlation window. For example, the transmission time offsets should be set to at least one chip, and preferably at least two chips, for Spread Spectrum signals to enable the transmitted signals to be received within separate correlation windows of the combiner (or tap delay lines) (e.g., each transmitted signal should be received within a correlation window of a different tap delay line, and should not be received by the receiving communication devices within the same chip). The transmission time offsets may include small durations such that the signals are substantially simultaneously transmitted by the transmitting communication devices. Accordingly, the phrase "substantially simultaneously" as used herein and in the claims in connection with transmitting signals means that the signals are transmitted close enough in time to be received by the receiver within a time window that permits the signals to be combined. The transmission times (or transmission time offsets) may be determined by any communication device within the transmitting cluster, and may be distributed in that cluster in any fashion and via any communication technique or protocol.

The communication devices may transmit the signals utilizing any transmission scheme (e.g., Spread Spectrum, etc.). The multipath window of the receiving communication devices may be set to any suitable duration enabling receipt of all or substantially all the transmitted signals (for a message) (e.g., including the transmission time differences, and any additional offsets for drift, propagation, etc.).

It should be understood that present invention embodiments are not limited to any particular protocol, messaging scheme, or type of channel access, and are useful in any context or network that would benefit from an increase in the power of received signals resulting from the combined power of distributed transmitters. The signal interchanges would preferably be cooperatively sent to ensure that the signal interchanges are within the multipath processing window of destination communication devices. Further, the communication devices of present invention embodiments may be stationary or mobile devices. The mobile devices should be moving closely together so that the multipath window intervals are effective for coherent integration of the received signals. In addition, the present invention embodiments may employ alternative techniques for combining the signals. For example, heuristic "combining" can be used (e.g., phase matching and adding the magnitude of selected paths).

The receiving team for a communication protocol may reply to a message from an originating team in substantially the same manner described above. The transmission times (or transmission time offsets) of the communication devices may be set to any desired values enabling the transmitted signals to be constructively combined at the originating team. The transmission times (or transmission time offsets) are preferably predetermined, where the reply is transmitted from the communication devices without coordination of transmission times to maintain the communication protocol. Alternatively, the transmission times (or transmission time offsets) for the reply may be coordinated and determined by any communication device within the receiving team and distributed in that team in any fashion and via any communication technique or protocol.

The transmission times (or transmission time offsets) may be predetermined, or determined dynamically based on any suitable conditions (e.g., distances, locations of transmitting and/or receiving communication devices, etc.) and provided to the communication devices of a team in any fashion and via any communication technique or protocol. The distances may be determined based on GPS or other information, and can reduce the occurrence of the spatial diversity impeding the temporal diversity of the transmitted signals. Alternatively, the transmission times (or transmission time offsets) may consider the various locations of the communication devices to compensate for the effects of spatial diversity on temporal diversity (e.g., determine transmission times or transmission time offsets that are not affected by spatial diversity).

From the foregoing description, it will be appreciated that the invention makes available a novel method and apparatus for cooperative communications between groups of communication units, wherein transmissions from plural communication units of a group are synchronously combined at receiving communication units within a distant group to extend range performance while maintaining the communication protocol employed for the communication.

Having described preferred embodiments of a new and improved method and apparatus for cooperative communications between groups of communication units, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. In a communication system comprising at least a plurality of transmitting communication devices and one or more receiving communication devices, wherein each receiving communication device includes a plurality of correlation time windows, a method of combining signals respectively transmitted from the transmitting communication devices to enhance reception at the receiving communication devices, comprising:

(a) determining a different transmission time for each of the plurality of transmitting communication devices at a first transmitting communication device, wherein each of said different transmission times varies from one another by at least a duration of said correlation time window to enable signals transmitted by the plurality of transmitting communication devices to be received within different ones of said correlation time windows to be combinable by a corresponding receiving communication device, and transmitting said different transmission times to corresponding transmitting communication devices to coordinate transmissions of the plurality of the transmitting communication devices such that a plurality of transmitted signals are respectively transmitted over the same communication channel by the plurality of transmitting communication devices at the different transmission times, each of the transmitted signals including an information signal which is coherently combinable with corresponding information signals in others of the transmitted signals;

(b) receiving the transmitted signals at each of the receiving communication devices such that respective arrival times of the transmitted signals are offset from one another as a function of respective positions of the transmitting communication devices and the different transmission times;

(c) time aligning the transmitted signals to compensate for the respective arrival times of the transmitted signals;

(d) combining the transmitted signals to form a combined signal including at least a combined information signal; and (e) detecting the combined signal to determine the presence of the transmitted signals.

2. The method of claim 1, wherein:
each of the transmitted signals further comprises an acquisition signal;

(b) includes correlating the acquisition signal of transmitted signals received by the receiving communication devices to a stored signal to estimate the arrival times of the transmitted signals; and (d) includes combining information signals from at least some of the transmitted signals correlated in (b) to form the combined information signal.

3. The method of claim 2, wherein the acquisition signal in each of the transmitted signals is identical.

4. The method of claim 2, wherein (c) includes phase rotating at least some of the transmitted signals correlated in (b) to adjust a relative timing of the transmitted signals to account for timing offsets among the respective arrival times of the transmitted signals.

5. The method of claim 1, wherein the transmitted signals arrive at each of the receiving communication devices within an acquisition time interval having a duration sufficiently short to permit combining of the transmitted signals.

6. The method of claim 1, wherein the information signal in each of the transmitted signals is identical.

7. The method of claim 1, wherein each of the transmitted signals includes a serial probe comprising a known data sequence, the method further comprising:

(f) determining a channel impulse response from the serial probe.

8. The method of claim 1, wherein the transmitted signals are heuristic combined by phase matching and adding the magnitude of the transmitted signals.

9. The method of claim 1, wherein the transmitted signals are combined using an equalizer.

10. The method of claim 1, wherein at least one of the transmitting and receiving communication devices is a mobile communication device.

11. The method of claim 1, wherein the transmitting and receiving communication devices utilize a communications protocol employing transfer of messages, wherein the transmitted signals include a protocol message, and the method further includes:

(f) transmitting from each of a plurality of receiving communication devices a reply to said protocol message at a different predetermined corresponding transmission time to maintain said communications protocol, wherein said reply is transmitted by each receiving communication device without coordination of the transmission times with other receiving communication devices.

12. The method of claim 1, wherein a duration of each of said plurality of correlation windows includes a duration of a chip of a spread spectrum technique.

13. In a communication system comprising at least a plurality of transmitting communication devices and one or more receiving communication devices, wherein each receiving communication device includes a plurality of correlation time windows, a method of coordinating transmission of signals respectively transmitted from the transmitting communication devices to the receiving communication devices, comprising:
(a) establishing a common time reference among the transmitting communication devices;
(b) determining a different future time for transmission for each of the plurality of transmitting communication devices, wherein each of said different transmission times varies from one another by at least a duration of said correlation time window to enable signals transmitted by the plurality of transmitting communication devices to be received within different ones of said correlation time windows to be combinable by a corresponding receiving communication device, and commanding each of the transmitting communication devices to transmit signals to the receiving communication devices at the corresponding different future time; and
(c) respectively transmitting a plurality of signals from each of the transmitting communication devices at the respective future times, such that the plurality of signals are respectively transmitted over the same communication channel, each of the signals including an information signal which is coherently combinable with corresponding information signals in others of the signals.

14. The method of claim 13, wherein a duration of each of said plurality of correlation windows includes a duration of a chip of a spread spectrum technique.

15. A communication system, comprising:
a plurality of transmitting communication devices including a first transmitting communication device to determine a different transmission time for each of the plurality of transmitting communication devices and transmit said different transmission times to corresponding transmitting communication devices, wherein each of said plurality of transmitting communication devices is configured to respectively transmit a plurality of transmitted signals over the same communication channel at the different corresponding transmission time, each of the transmitted signals including an information signal which is coherently combinable with corresponding information signals in others of the transmitted signals; and
one or more receiving communication devices each including a plurality of correlation time windows and configured to receive the transmitted signals at respective arrival times which are offset from one another as a function of respective positions of the transmitting communication devices and the different transmission times, wherein each of said different transmission times varies from one another by at least a duration of said correlation time window to enable signals transmitted by the plurality of transmitting communication devices to be received within different ones of said correlation time windows to be combinable by a corresponding receiving communication device, said receiving communication devices time aligning the transmitted signals to compensate for the respective arrival times and combining the transmitted signals to form a combined signal.

16. The system of claim 15, wherein each of the transmitted signals further comprises an acquisition signal and each receiving communication device comprises:
a correlator configured to correlate the acquisition signal of transmitted signals to a stored signal to estimate the respective arrival times of the transmitted signals;
a phase rotator configured to phase rotate at least some of the transmitted signals to adjust a relative timing of the transmitted signals to account for timing offsets among the respective arrival times of the transmitted signals; and
a signal combiner configured to combine the transmitted signals to form the combined signal.

17. The system of claim 15, wherein the information signal in each of the transmitted signals is identical, and the combined signal includes at least a combined information signal, each receiving communication device further comprising a signal detector configured to detect the combined signal and determine the information contained in the combined information signal.

18. The system of claim 15, wherein each receiving communication device further comprises:
a digital matched filter configured to generate a matched filter signal based on the transmitted signals received by that receiving communication device.

19. The system of claim 15, wherein each receiving communication device further comprises:
a plurality of tapped delay lines configured to modify the phase and amplitude of the transmitted signals.

20. The system of claim 15, wherein each of the transmitted signals includes a serial probe comprising a known data sequence, and wherein each receiving communication device determines a channel impulse response from the serial probe.

21. The system of claim 15, wherein each receiving communication device heuristically combines the transmitted signals by phase matching and adding the magnitude of the transmitted signals.

22. The system of claim 15, wherein each receiving communication device comprises an equalizer.

23. The system of claim 15, wherein at least one of the transmitting and receiving communication devices is a mobile communication device.

24. The system of claim 15, wherein a duration of each of said plurality of correlation windows includes a duration of a chip of a spread spectrum technique.

25. The system of claim 15, further including a plurality of receiving communication devices, wherein the transmitting and receiving communication devices utilize a communications protocol employing transfer of messages, wherein the transmitted signals include a protocol message, wherein each of the plurality of receiving communication devices transmits a reply to said protocol message at a different predetermined corresponding transmission time to maintain said communications protocol, and wherein said reply is transmitted by each receiving communication device without coordination of the transmission times with other receiving communication devices.

* * * * *